United States Patent [19]
Adams

[11] Patent Number: 5,759,415
[45] Date of Patent: Jun. 2, 1998

[54] METHOD AND APPARATUS FOR SEPARATING FLOATING AND NON-FLOATING PARTICULATE FROM RAINWATER DRAINAGE

[75] Inventor: Thomas Adams, Portland, Me.

[73] Assignee: Vortechnics, Inc., Portland, Me.

[21] Appl. No.: 697,319

[22] Filed: Aug. 22, 1996

Related U.S. Application Data

[63] Continuation-in-part of Ser. No. 216,883, Mar. 23, 1994, abandoned, which is a continuation-in-part of Ser. No. 997,892, Dec. 29, 1992, abandoned, which is a continuation-in-part of Ser. No. 769,832, Oct. 2, 1991, abandoned.

[51] Int. Cl.$^6$ .................................................. B01P 17/025
[52] U.S. Cl. ......................... 210/776; 210/800; 210/519; 210/521; 210/532.1; 210/802
[58] Field of Search ........................... 210/163, 164, 210/513, 519, 521, 533, 532.1, 535, 534, 413, 428, 767, 776, 800, 801, 802, 252, 295, 302

[56] References Cited

U.S. PATENT DOCUMENTS

| | | | |
|---|---|---|---|
| 601,794 | 5/1898 | Hershberger | 210/170 |
| 1,675,714 | 7/1928 | Koch | 210/163 |
| 3,815,748 | 6/1974 | Johannessen | 210/163 |
| 3,815,749 | 6/1974 | Thompson | 210/163 |
| 4,363,731 | 12/1982 | Filippi | 210/532.1 |
| 4,935,132 | 6/1990 | Schaier | 210/163 |
| 4,983,295 | 1/1991 | Lamb et al. | 210/521 |
| 4,985,148 | 1/1991 | Monteith | 210/519 |
| 5,004,534 | 4/1991 | Buzzelli | 210/164 |
| 5,186,821 | 2/1993 | Murphy | 210/519 |

*Primary Examiner*—David A. Reifsnyder
*Attorney, Agent, or Firm*—Chris A. Caseiro; Thomas L. Bohan

[57] ABSTRACT

Drainage water having floating and non-floating particulate is collected and processed to separate out in the floating from the non-floating particulate, thereby cleaning the flow of water through the system during sudden storms or during steady rainfall conditions.

30 Claims, 8 Drawing Sheets

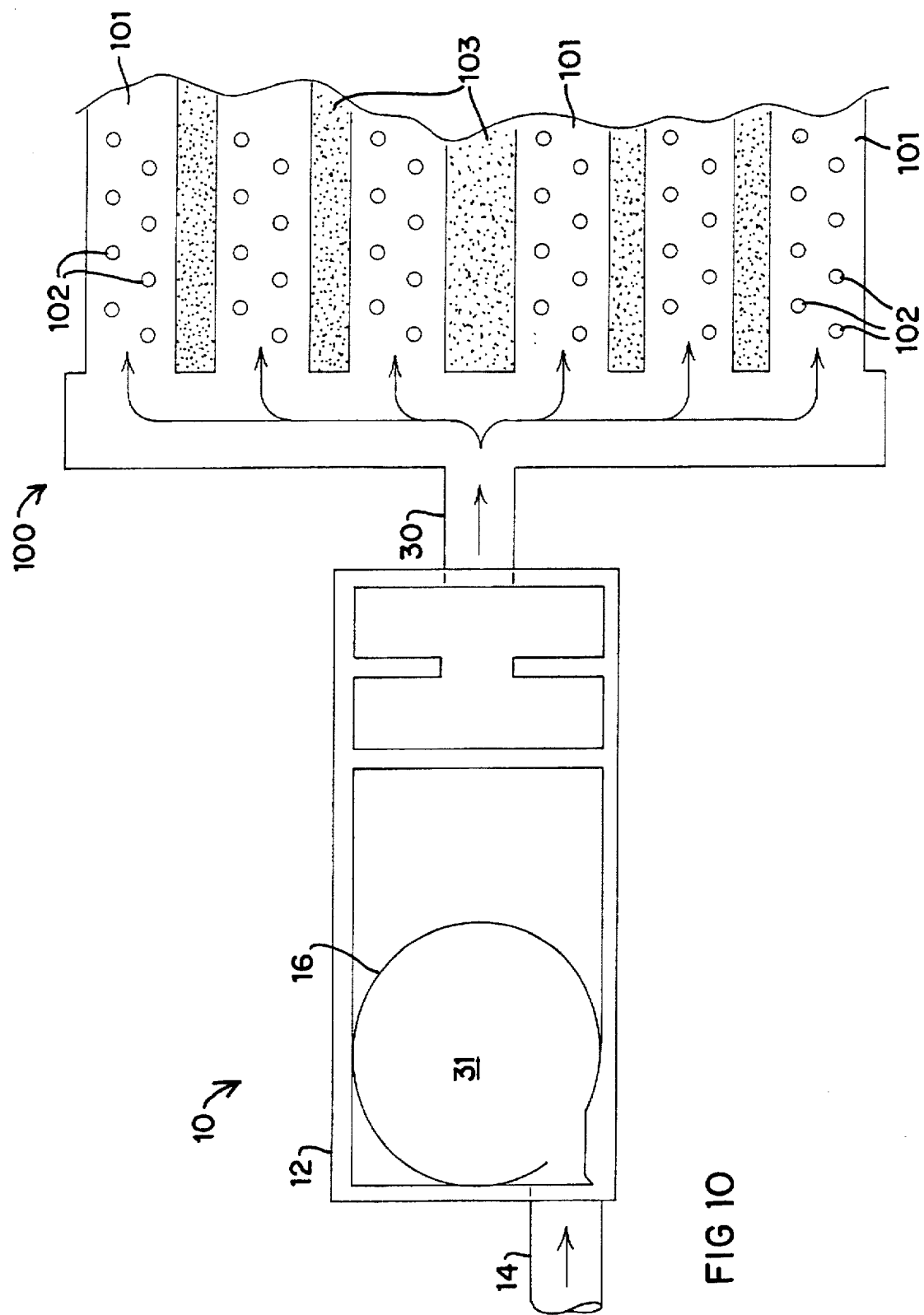

5,759,415

1

METHOD AND APPARATUS FOR SEPARATING FLOATING AND NON-FLOATING PARTICULATE FROM RAINWATER DRAINAGE

CROSS REFERENCE TO RELATED PATENT APPLICATIONS

The present application is a continuation-in-part of my earlier C-I-P patent application Ser. No. 8,216,883, filed Mar. 23, 1994 now abandoned, which is a continuation-in-part of my earlier patent application Ser. No. 07/997,892 filed Dec. 29, 1992, now abandoned which is a CIP of the parent appln. Ser. No. 07/769,832, filed Oct. 2, 1991, now abandoned.

BACKGROUND OF THE INVENTION

1. The Field of the Invention

The present invention relates to a containment system that separates floating and non-floating particulate, such as oil and sand respectively, from water drainage and in particular to a containment system which is more efficient than the prior art.

2. Prior Art

The art of controlling drainage water is very old. There have been many attempts to provide systems which will separate materials entrained in the water so that substantially only water flows past the catch basin or trap. The following discussion covers some of the many known approaches to solving this problem.

U.S. Pat. No. 601,794 discloses a catch-basin for sewers intended to remove dirt and trash from water that has run off a street.

U.S. Pat. No. 1,675,714 discloses a catch basin which is intended to catch debris or trash of the nature that would obstruct the sewer. This invention lacks means for separating floating particulate form the rain water.

U.S. Pat. No. 3,815,749 discloses a street drain to be used in conjunction with a sewage system in which there is a water collection basin and a dry well. There are two discharge openings, one to discharge to the dry well and the other to discharge to the sewer system.

U.S. Pat. No. 4,363,731 discloses a device for regulating the rate of flow of waste water that is mixed with rainwater bay passing the mixture through a series of orifices.

U.S. Pat. No. 4,935,132 discloses a drain pipe filter which is intended to separate oily contaminants exiting a floating drain. This device is not intended to separate solid particulate from rainwater in the manner of the present invention.

U.S. Pat. No. 4,983,295 discloses a cylindrical vessel in which floatable and non-floatable particulate that are suspended in water are separated by means of rotational movement of the water.

U.S. Pat. No. 4,985,148 discloses a separator tank for rain and waste water wherein the water is introduced and forced to travel through a pre-defined passage leading to an exit pipe. This invention does not provide means for separating floatable particulate when an overflow condition, as may be encountered during an intense rainfall, occurs.

SUMMARY OF THE INVENTION

It is an object of the present invention to remove floating and non-floating particulate from run off water during either sudden storms or steady prolonged rainfalls.

A further object of the present invention is to remove large amounts of surface run-off water, especially during a storm,

2 separating residues contained in such water, and processing the water in such a way that no water builds up on the street, which would result in flooding conditions.

It is a further object of the present invention to provide a safe and effective means to collect, remove, and dispose of accumulated floating and non-floating particulate. The potential toxic and environmentally unsafe nature of this collected particulate makes this invention an important safeguard to both cleaning drainage water and removal of dangerous contaminants.

The present invention has a tank defining a chamber with an inlet and a pair of vertically spaced outlets. A bulkhead with openings is spaced opposite the inlet and extends from the base of the chamber. A baffle is located between the bulkhead and the outlets and extends from the top of the chamber to near the bottom. An orifice plate or plates is adjustable mounted in series with the outlets and controls the rate of flow therethrough. The system is seen as having four sections, namely, a non-floating particulate containment chamber; a floating particulate containment chamber; a flow control chamber; and an outlet chamber. It is to be understood that each of the noted chambers may be of the same size, that they may each be of different size, or that several may be of the same size while others may be of different size, without deviating from the basic operation of the invention.

BRIEF DESCRIPTION OF THE DRAWINGS

The present invention will now be described, by way of example, with reference to the accompanying drawings in which:

FIG. 10 is a schematic diagram of the present invention as shown in FIG. 1 in combination with a sand-filter.

DETAILED DESCRIPTION OF THE PREFERRED EMBODIMENT

Figure 1:
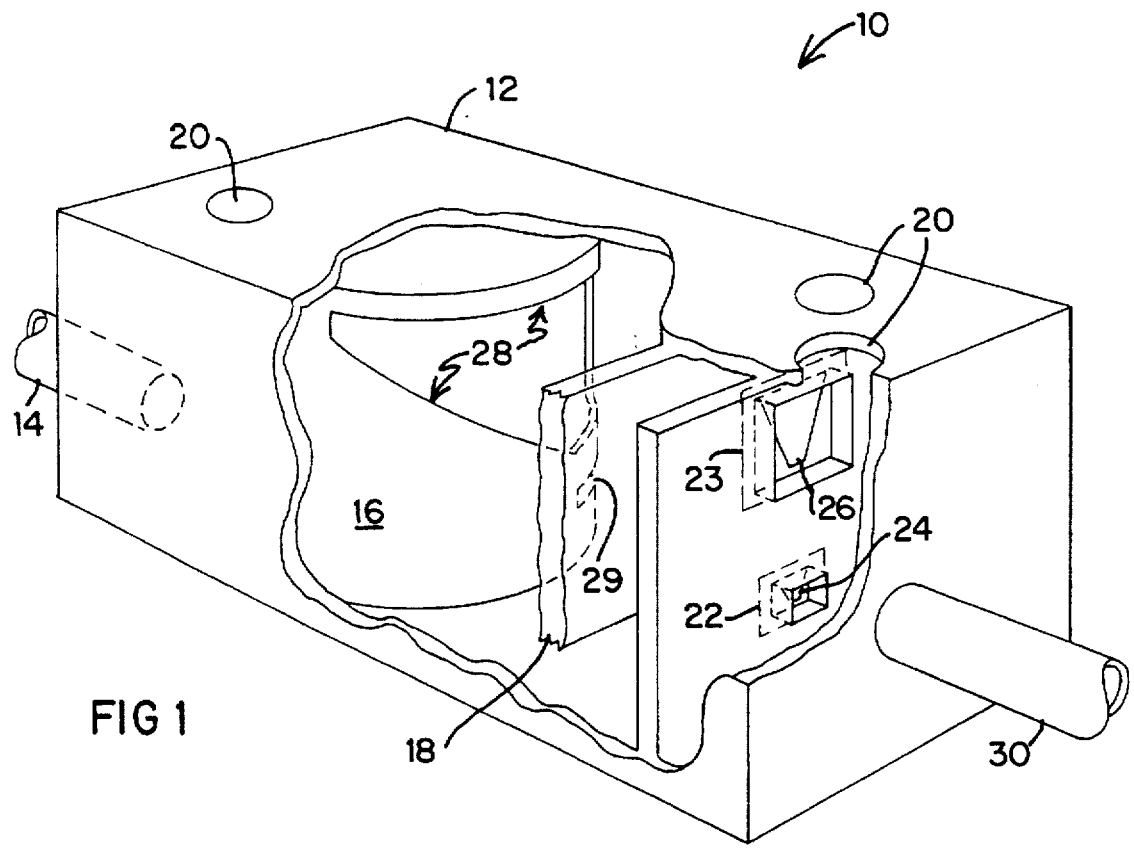
FIG. 1 is a perspective view of the preferred embodiment partially broken away to reveal the bulkhead, openings, baffle and control outlet(s)

The invention 10 is shown in FIG. 1 in perspective view and includes a tank 12, an inlet pipe 14, a bulkhead 16, baffle 18, at least one removable cover 20, orifice plate 22, and weir plate 23, low-level outlet 24, and high-level outlet 26, openings 28 and 29 in bulkhead 16, and outlet pipe 30. It will be noted, from FIG. 2, that the bulkhead 16 and the wall of the tank 12 make a generally ovate or circular non-floating particulate containment chamber and that the inlet pipe is axially offset from the center of this chamber. It is anticipated that bulkhead 16 can be, but is not limited to a circular wall configuration.

The water enters the subject invention through inlet pipe 14 and, due to the offset of the pipe and chamber shape, a swirling motion is imparted to the flow. The non-floatable particulate entrapped therein is contained by bulkhead 16. The bulkhead openings 28 and 29 allow passage of water. The bulkhead is constructed such that the floatable particulate flows through the bulkhead. All of the floatable particulate is then contained by the baffle 18.

Figure 2:
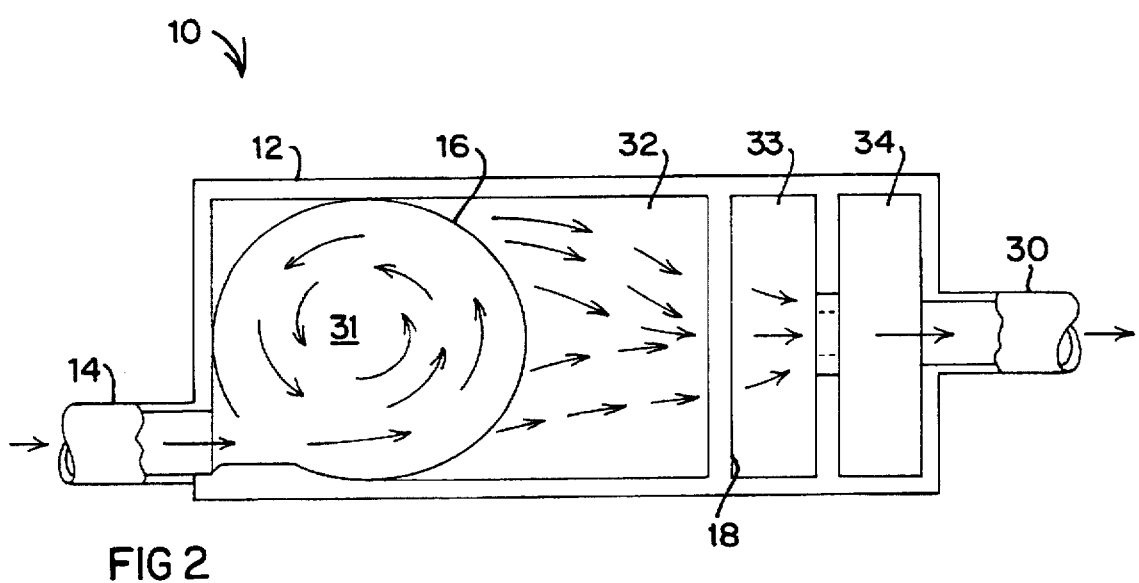
FIG. 2 is a horizontal section through the present invention looking from top to bottom.

The orifice plate 22, through which the low level water exits, controls the low level water flow. The weir plate 23, through which the high level water exits controls the high level water flow. The arrows in FIG. 2 show the drainage path taken by the rainwater through the subject invention. It is anticipated that the low level outlet may alternatively be controlled by some other device than an orifice as appropriate to the expected flow rate to which it will be subjected.

FIGS. 3A to 3F show the present invention during different stages of operation. The phantom line FIG. 3A indicates the water level 50 before or after a drainage event when there is little or no drainage flow. The phantom line in FIG. 3B indicates the water level 50 during the initial phase of operation with non-floatable particulate being retained by bulkhead 16 and floatable particulate by baffle 18. The phantom line in FIG. 3C indicates the water level 50 during the transitional phase of operation as the volume of flow increases. The phantom line in FIG. 3D indicates the water level 50 during full capacity phase operation. The phantom line in FIG. 3E indicates the water level 50 which decreases during the phase in which water ceases to enter the invention 10. The phantom line in FIG. 3F indicates the water level 50 after all drainage has ceased, and the non-floating particulate containment chamber 31 has been cleaned.

The tank 12, preferably, has a volume in the range of one hundred to one thousand cubic feet with overall dimensions of four to ten feet wide, by eight to eighteen feet long, by four to eleven feet high. The inlet pipe 14 is, preferably, in the range of one to three feet in diameter. The bulkhead 16 is, preferably, from about three feet high to the height of the tank and the size of the opening under the baffle is in the range of one to three feet and is the width of the tank.

The low-level outlet 24 is in the range of one to three feet in a generally rectangular orientation. The high-level outlet 26 is, preferably, in the range of two to four feet in a generally rectangular orientation. The removable covers are preferably one to three feet in diameter and preferably are made of cast iron. The outlet chamber 34, preferably, has a volume of fifty to three hundred cubic feet and is preferably substantially equal in volume to the flow control chamber 33. The non-floating particulate containment chamber 31 and the floating particulate containment chamber 32 have been shown to be substantially the same size for convenience of the drawings only.

Additionally, the containment chambers do not have to be similarly sized, and therefore it is within the scope of the present invention to have the two chambers of different size in accordance with local drainage requirements.

Preferably, all pipes are made of material selected for durability and resistance, especially non-reaction to the composition of the materials contained in the flow. Preferably the pipes are made of plastic. The tank, bulkhead, and baffle are preferably made of concrete, although other materials may also be used.

In use, water drainage possibly mixed with sewage, will enter the tank 12 through the inlet 14, resulting in a swirling motion being imparted thereto. Initial drainage at very low levels begins through opening 29. As flow levels increase the water level rises behind the bulkhead 16 until it is higher than the crest of opening 28 at which point the water level rises in the rest of the tank 12. Oil and other floating particulate, which are mixed in the water rise along with the overall water level.

Figure 3A:
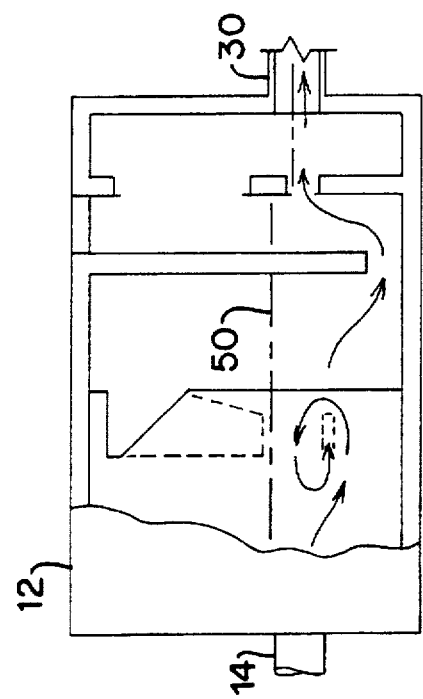
FIG. 3A is a side elevation, partially broken away, showing the subject invention in a dry weather condition.
Figure 3B:
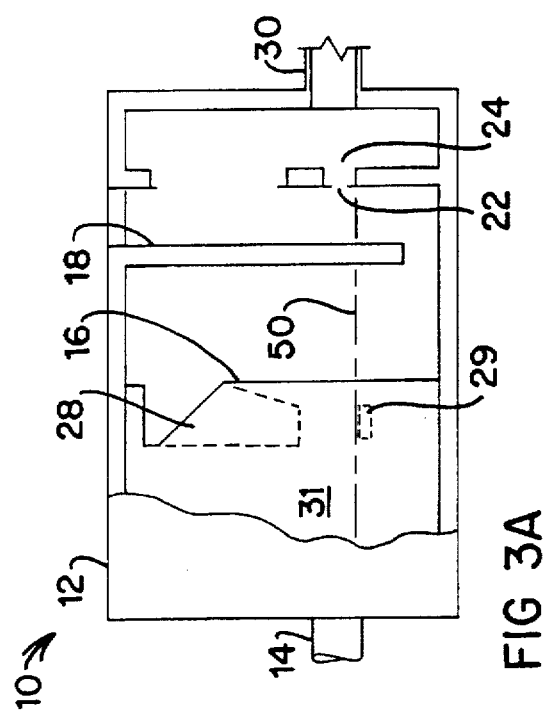
FIG. 3B is a view similar to FIG. 3A showing the subject invention during the initial phase of operation.

The overall water level rises as the water flows through the openings 28 and 29 and exits through the low-level outlet 24 at the rate controlled by the orifice plate 22. The orifice plate 22 is slightly higher than the opening 29 thereby allowing skimming of the non-floating particulate into the containment chamber during cleaning. The overall water level rises because the inlet flow rate exceeds the outlet flow rate. This is referred to as the initial phase, as shown in FIG. 3B.

Figure 3C:
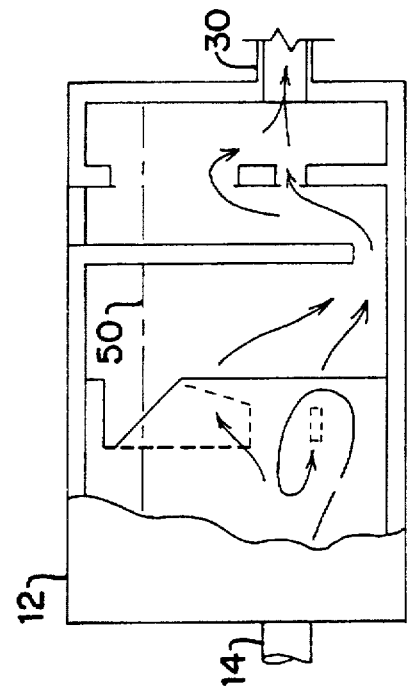
FIG. 3C is a view similar to FIG. 3A showing the subject invention during the transitional phase of operation.
Figure 3D:
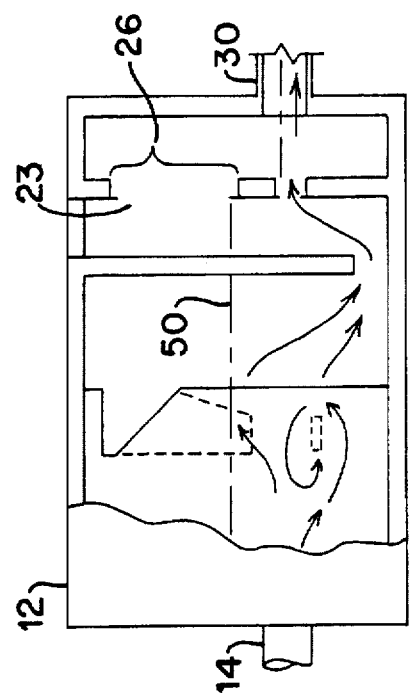
FIG. 3D is a view similar to FIG. 3A showing the present invention during full capacity phase of operation.
Figure 4:
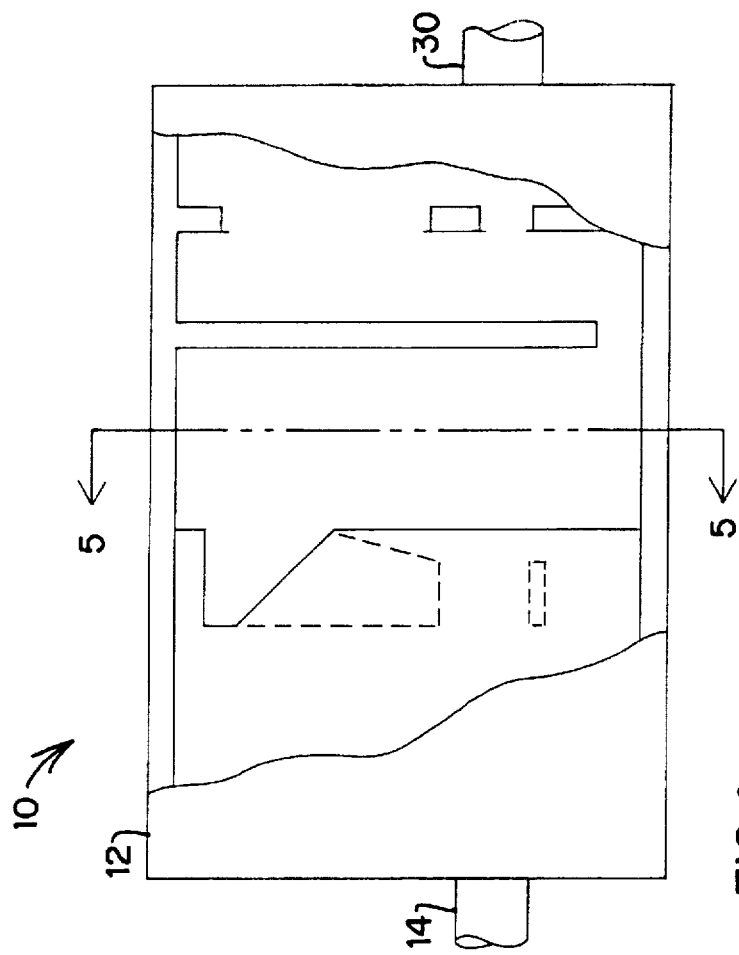
FIG. 4 is a longitudinal vertical section through the present invention.

During the next phase, referred to as the transition phase, as shown in FIG. 3C, the vertical separation distance between the floating particulate and the bottom of the baffle 18 increases. The water level rises to the level of the high level outlet 26, as shown in FIG. 3D. The rate of flow of the exiting water is increasing slightly as the water level is increasing but is still controlled by the orifice plate 22. This continues until the water level rises above the opening in the weir plate 23 at the high level outlet 26. At this point the flow rate through the tank 12 begins to increase significantly.

Figure 3E:
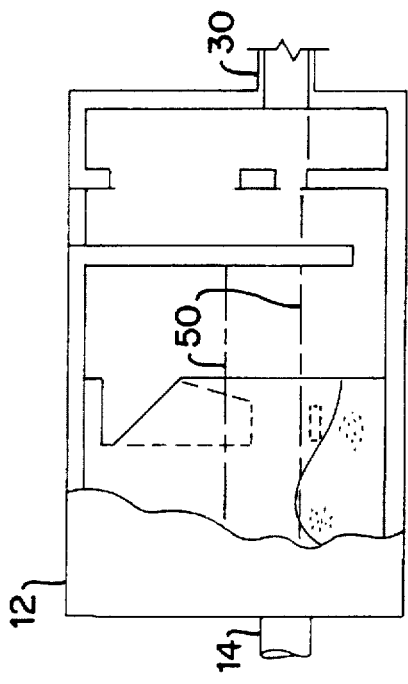
FIG. 3E is a view similar to FIG. 3A showing the present invention during the final phase of operation when water ceases to enter the apparatus.
Figure 3F:
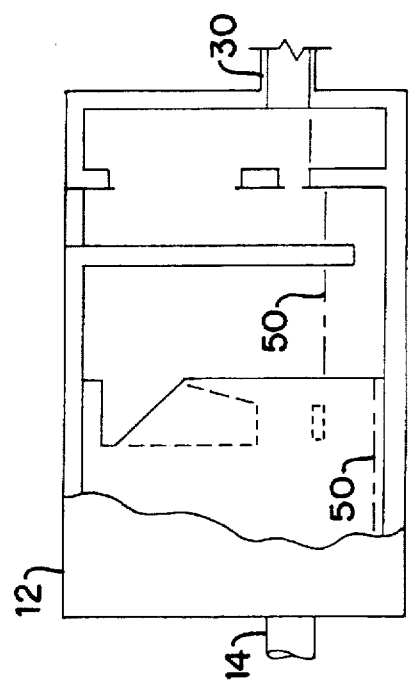
FIG. 3F is a view similar to FIG. 3A showing the present invention after the collected non-floating particulate has been removed and drainage has ceased.

During the next phase, referred to as the full capacity phase, as shown in FIG. 3D, the high outlet 26 is controlled by plate 23 which is designed to transfer as much water as the outlet pipe 30 can discharge. This continues until the rate at which the water is introduced through the inlet 14 decreases to the point where the water level drops below the level of the high-level outlet 26. The remaining water in the tank 12 is discharged at a rate determined by the orifice plate 22. Eventually the water level drops to the invert elevation of the orifice plate 22 which covers the low level outlet 24 as shown in FIG. 3E. Now the point has been reached where there is no flow through the tank 12.

The overall low water level as shown in FIG. 3E is an important feature of the invention 10 because it permits an easy inspection. It is anticipated that the level of particulate accumulation can be determined for example by removing covers 20 to see if there is enough accumulated floating and non-floating particulate to necessitate the cleaning to the tank 12.

Figure 5:
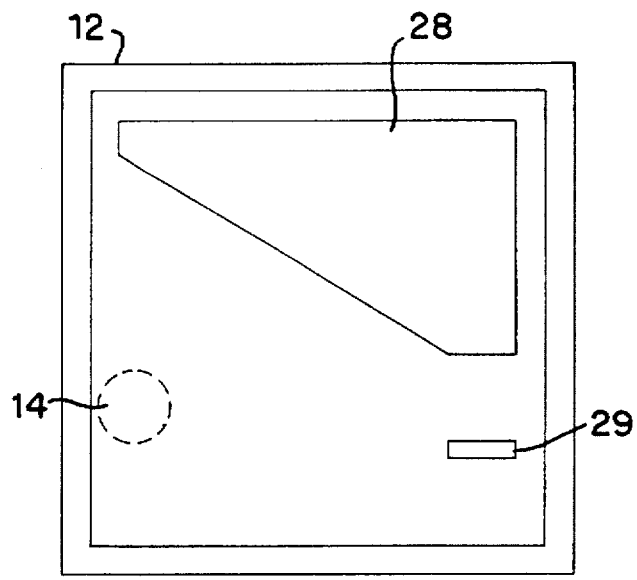
FIG. 5 is a transverse vertical section taken along line 5—5 of FIG. 4.

FIG. 5 shows the preferred embodiment of the bulkhead 16. The incoming flow is deflected by the curved wall of the non-floating particulate chamber creating a swirling action. Once the fluids drain, the swirling action continues to prevent the non-floating particulate from being carried through the bulkhead openings.

It is contemplated that other patterned arrays of openings in the bulkhead may be either substantially rectangular or circular. The only general restriction is that no openings should be substantially opposite the inlet to avoid non-floating material from being carried through the bulkhead by shear force of the flow. Also opening 28 should be no lower than the midpoint of the inlet pipe for substantially the same reason.

Figure 6:
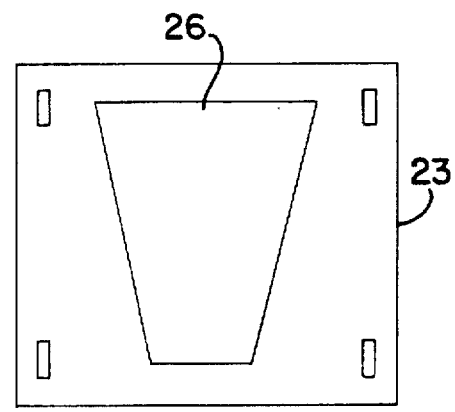
FIGS. 6 and 7 are enlarged elevations of the preferred embodiments of the weir plate and orifice plate respectively.
Figure 7:
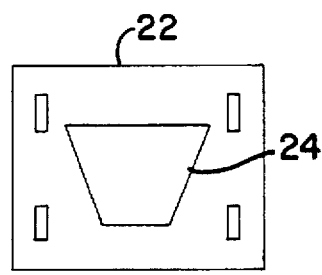
Figure 8:
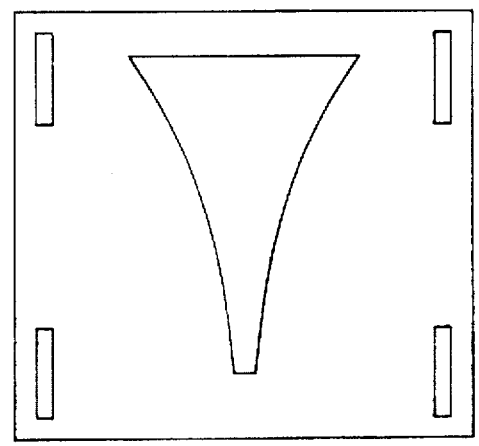
FIG. 8 is an enlarged elevation that combines FIGS. 6 and 7 into an alternative flow control embodiment.

FIGS. 6 and 7 show preferred embodiments of the weir plate and orifice plate with profiled openings to control flow to the outlet pipe 30. The vertical slots are for adjustable mounting of the plates. Other opening profiles are also possible for example, using only one aperture and plate which may produce a varying aperture for controlling flow through the outlet chamber 39. For example, the single plate and single aperture shown in FIG. 8 provides a single means for controlling water level in the movement of the water from the flow control chamber 33 to the outlet chamber 34. In that embodiment of the invention the wide upper section of the single aperture accommodates larger volumes of water experienced with high water levels, while the narrow lower section accommodates less water volume at low water levels. Of course, it is to be understood that variations in single aperture shape may provide suitable water flow control.

Figure 9:
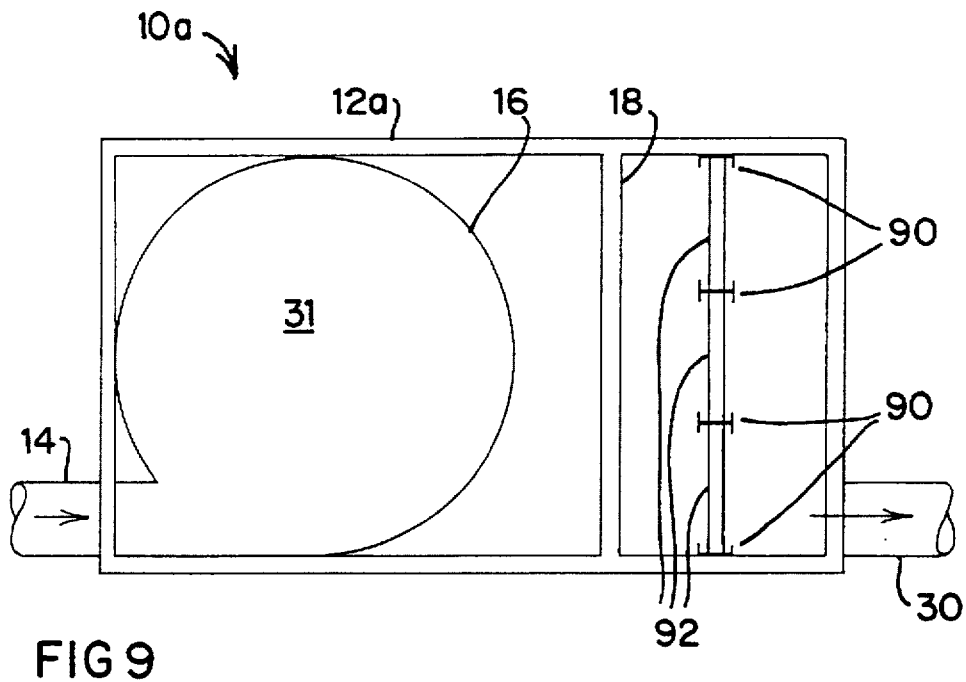
FIG. 9 is a horizontal section view showing an alternate embodiment of the present invention.
Figure 9A:
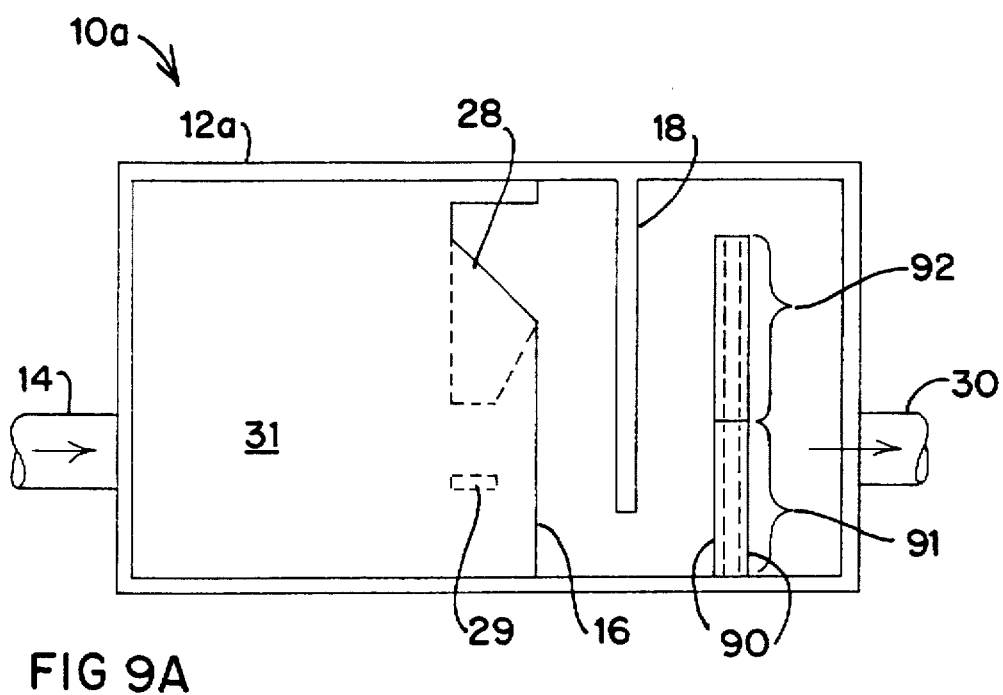
FIG. 9A is a side elevation view of the alternative embodiment in FIG. 9.

FIGS. 9 and 9A show a horizontal section view showing an alternate embodiment 10a of the present invention. This embodiment 10a includes an alternative means for controlling the flow of water from the separation tank to the outlet portion of an alternative tank 12a of the present invention. This alternative means would be used in place of the weir plate and orifice designed to control high-level and low-level water flow rates, respectively. Screen capture channels 90 allow a lower screen portion 91 and an upper screen portion 92 to be removeably dropped into place. Lower screen portion 91 is a fine-mesh screen that filters out small particulates that may be transferred from the floating and non-floating particulate section of the tank. Upper portion 92 is a coarse-mesh screen that filters out relatively large particulates from the floating and non-floating particulate sections. All other elements of the tank 12a remain the same as referenced with respect to FIG. 1. FIG. 10 shows a schematic diagram of the present invention as shown in FIG. 1 in combination with a downstream fluid distribution system 100, such as, for example, a retention area 100 that is external to the tank 12. The retention area 100 can be of any one of a variety of commonly known designs capable of receiving drain water from the tank 12 by way of a distributor such as one or more distribution tubes 101. The distribution tubes may have perforations 102, as shown, when used in conjunction with a porous filtering bed, such as sand 103 that forms the retention area 100. Any material similar to sand 103 may be used to disperse the drain water so long as it provides good percolation characteristics, including, but not limited to, peat and compost filtering media, for example. Alternatively, the retention area 100 may be a simple holding tank, with the distribution tubes 101 being non-perforated.

Figure 11:
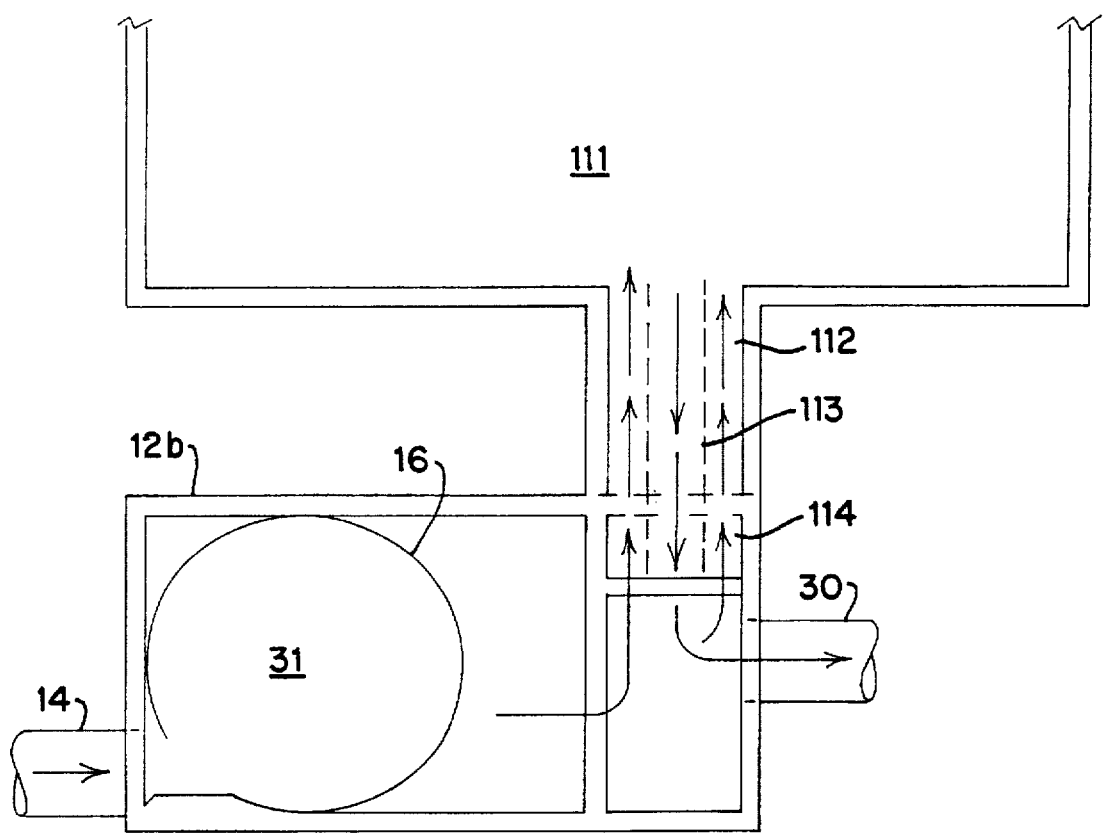
FIG. 11 is a schematic diagram of an alternative embodiment of the present invention in combination with a detention basin.
Figure 11A:
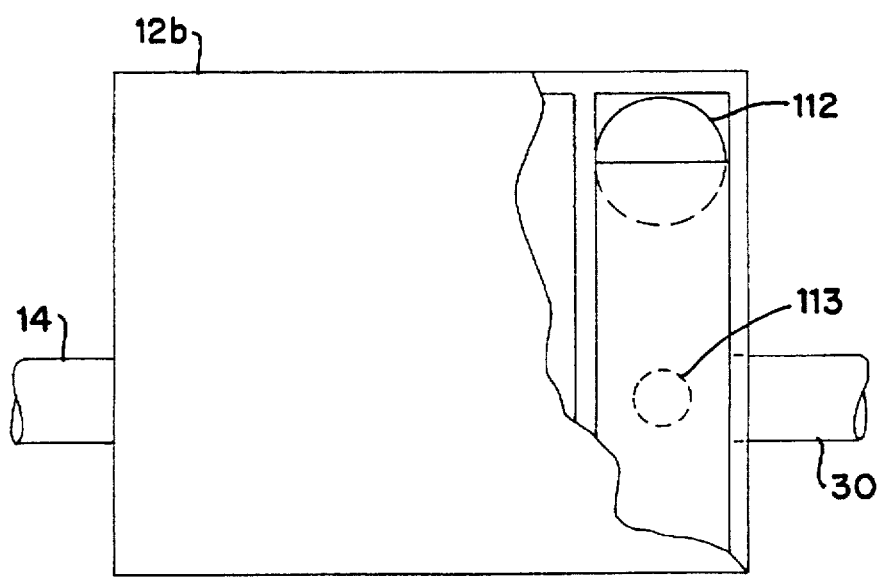
FIG. 11A is a side view of the alternative embodiment in FIG. 11.

FIGS. 11 and 11A show a schematic diagram of an alternative embodiment of the present invention in combination with a detention basin 111. The detention basin 111 is used for diverting higher drain water flow rates than those permitted under most regulatory requirements. A supplemental tank discharge 112 is shown in addition to outlet pipe 30 for the purpose of transferring such sudden flow occurrences. Excessive drain water exits from tank 12b through discharge 112 to detention basin 111. A return 113 is provided to move drain water out of the detention basin 111 utilizing a one-way valve 114 of the type known to those skilled in the art. The one-way valve permits the return of water from the detention basin 111 only after the sudden influx has passed. While FIGS. 10, 11, and 11A show two particular types of output receiving means, it should be noted that any other type of output receiving means for holding or dispersing drain water may be utilized without straying from the intended scope of the present invention.

Figure 12:
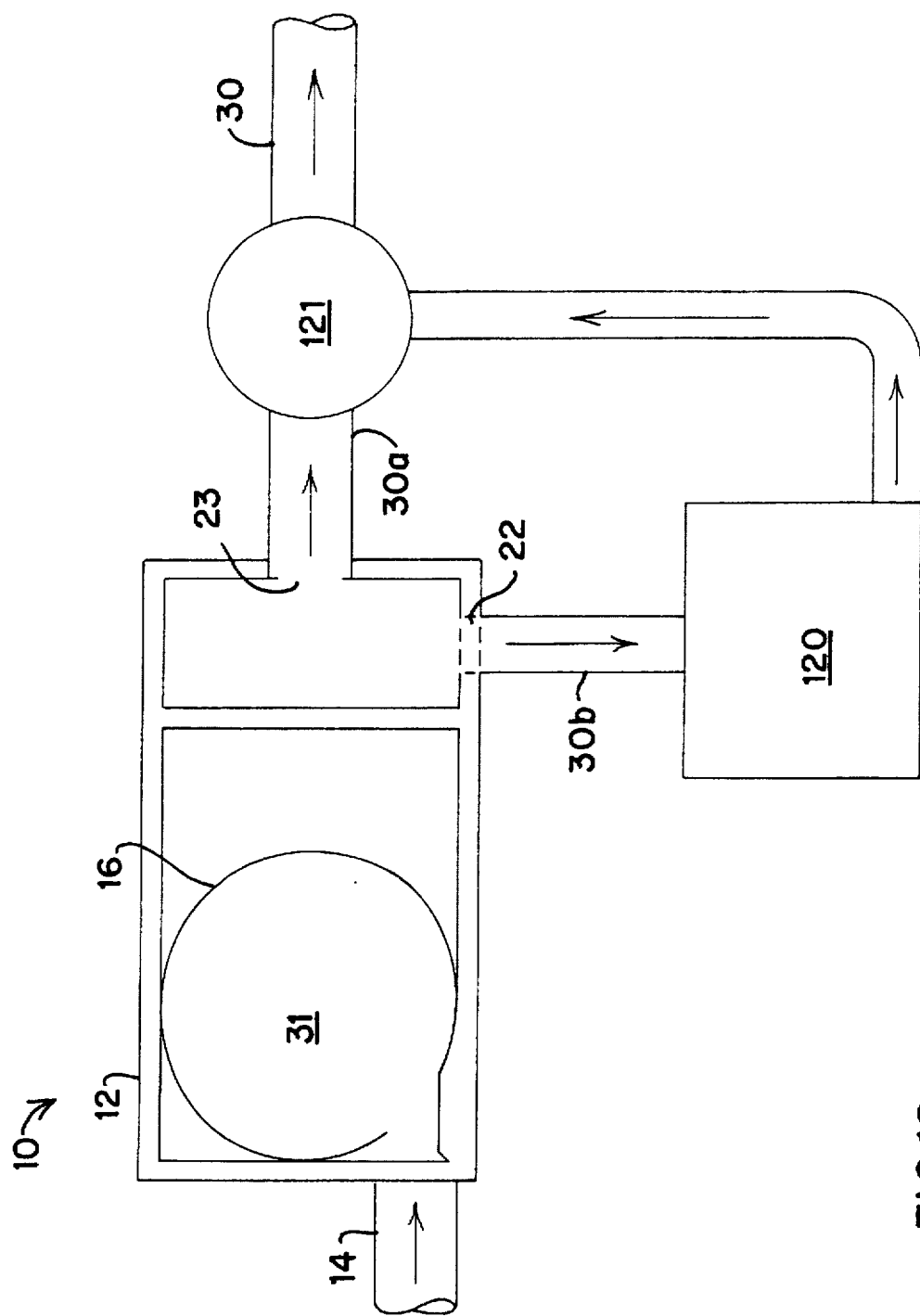
FIG. 12 is a schematic diagram of the present invention as shown in FIG. 1 in combination with an oil/water separator.

Additionally, any number of supplemental items designed to enhance the effectiveness of the tank 12 of the present invention may be coupled to the tank, including, but not limited to, placement proximate to the area of outlet pipe 30. For example, FIG. 12 is a schematic diagram of the present invention as shown in FIG. 1 in combination with an oil/water separator 120. The separator 120 is shown connected to a low-flow outlet 30b via orifice 22. A high-flow outlet 30a is connected to weir 23. The low-flow discharge runs through separator 120 where oil coalesces out of the drain water. The two flows paths reconnect at connector 121 and to outlet pipe 30. Although separator 120 is shown, it is noted that any drain water treatment device may be used in a manner similar to that of the separator 120 shown in FIG. 12. It has been observed that a separator such as the ECOSTAR™ oil/water separator made available by Environment XXI of East Pembroke, N.Y., would be a suitable add-on separator to the tank 12 of the present invention.

The present invention may be subject to many modifications and changes without departing from the spirit or essential characteristics of the present invention. The present embodiment should therefore be considered in all respects as illustrative and not restrictive of the present invention as defined in the appended claims.

What is claimed is:

1. An apparatus for separating floating and non-floating particulates from drain water, said apparatus comprising:
   (a) a tank including inlet means for introducing said drain water into said tank and tank outlet means for discharging said drain water;
   (b) a first containment means for receiving said drain water and for trapping non-floating particulate under relatively higher drain water flow rates and relatively lower drain water flow rates in a manner that restricts said non-floating particulate from exiting one or more openings of said first containment means;
   (c) a second containment means for trapping floating particulate under said relatively higher drain water flow rates and said relatively lower drain water flow rates in a manner that restricts said floating particulate from exiting one or more openings of said second containment means; and
   (d) means for controlling water level in said tank, wherein said means for controlling water level is designed to operate as a function of a flow rate of said drain water through said inlet means into said tank such that when said flow rate is relatively higher, said water level in said first containment means is greater than a level of said inlet means.

2. An apparatus as defined in claim 1, wherein said means for controlling water level in said tank includes a low-level outlet device and a high-level outlet device.

3. An apparatus as defined in claim 1, wherein said first containment means is a substantially cylindrical non-floating particulate containment chamber and said inlet means is an inlet pipe for delivering said drain water to said non-floating particulate containment chamber, and wherein said inlet pipe is tangential to said non-floating particulate containment chamber.

4. An apparatus as defined in claim 1, wherein said first containment means is a substantially cylindrical bulkhead section extending from a floor of said tank.

5. An apparatus as defined in claim 4, wherein said one or more openings of said substantially cylindrical bulkhead section include one or more slots therein.

6. An apparatus as defined in claim 5, wherein said inlet means is an inlet pipe, and wherein one of said one or more slots has a top level that substantially matches a bottom level of said inlet pipe.

7. An apparatus as defined in claim 6, wherein no slot is directly opposite said inlet pipe.

8. An apparatus as defined in claim 6, wherein at least one of said one or more slots is oriented essentially parallel with said floor of said tank.

9. An apparatus as defined in claim 1, wherein said second containment means is a baffle extending from a top of said tank to a point spaced above a floor of said tank and below a low-level outlet device of said means for controlling water level.

10. An apparatus as defined in claim 1, wherein said tank outlet means is a tank outlet pipe and said means for controlling water level in said tank includes an orifice plate having one or more apertures for discharging said drain water and means for adjusting the position of said orifice plate with respect to the position of said tank outlet pipe.

11. An apparatus as defined in claim 10, wherein said first containment means is an essentially cylindrical containment chamber and said inlet means is a tank inlet pipe, wherein said tank inlet pipe is positioned to introduce said drain water into said cylindrical chamber in a manner that causes a swirling motion of said drain water within said containment chamber.

12. An apparatus as defined in claim 10, wherein at least one of said one or more apertures of said orifice plate is an opening varying in configuration so as to control the level of said drain water in said tank by varying the flow of said drain water dischargeable from said second containment means.

13. An apparatus as defined in claim 1, wherein said tank outlet means is a tank outlet pipe and said means for controlling water level in said tank includes a weir plate assembly having means for adjusting the position of said weir plate assembly with respect to the position of said tank outlet pipe.

14. An apparatus as defined in claim 1, further comprising means for providing access to one or more of said containment means.

15. The apparatus as defined in claim 1, further comprising output receiving means for receiving said drain water from said tank outlet means.

16. The apparatus as defined by claim 15, wherein said output receiving means includes one or more distribution tubes.

17. The apparatus as defined in claim 16, wherein at least one of said one or more distribution tubes is perforated.

18. The apparatus as defined in claim 16, wherein each of said distribution tubes is positioned in a sand filter bed.

19. The apparatus as claimed in claim 16, wherein each of said distribution tubes is positioned in a peat filter bed.

20. The apparatus as defined in claim 15, wherein said output receiving means includes a controlled-outlet means for controlling direction of flow of said drain water from said tank outlet means, and a fluid-detention basin.

21. The apparatus as defined in claim 20, wherein said controlled-outlet means is a one-way valve.

22. The apparatus as defined in claim 15, further comprising a separator means for separating oil from said drain water, wherein said separator means is located between said low-level outlet device and said output receiving means.

23. The apparatus as defined in claim 1, wherein said tank outlet means is a tank outlet pipe and said means for controlling water level in said tank includes a removable screen.

24. The apparatus as defined in claim 23, wherein said screen includes a fine mesh section and a coarse mesh section for filtering said drain water, wherein said coarse mesh section is located above said fine mesh section.

25. A method for separating floating and non-floating particulate from drain water, comprising the steps of:
  (a) introducing said drain water into a separation tank under relatively higher flow rates and relatively lower flow rates;
  (b) containing all non-floating particulate with the use of a substantially cylindrical apertured containment wall forming part of said separation tank;
  (c) controlling the water level throughout said separation tank as a function of flow rate of said drain water by causing a level of said drain water within said separation tank to exceed a level of an inlet means of said separation tank when said flow rate of said drain water into said separation tank is said relatively higher flow rates;
  (d) trapping the floating particulate behind a baffle spaced above a floor of said separation tank and; and
  (e) discharging said drain water from said separation tank.

26. The method of claim 25, wherein a drain water level corresponding to said relatively higher flow rates of said drain water is controlled by introducing a weir plate.

27. The method of claim 25, wherein a drain water level corresponding to said relatively lower flow rates of said drain water is controlled by introducing a flow control orifice plate.

28. The method as defined in claim 25, wherein a level of said drain water is controlled by introducing a filter screen at a discharge of said separation tank.

29. The method as defined by claim 28, wherein said filter screen is formed of a coarse screen and a fine screen, wherein said coarse screen is located above said fine screen.

30. An apparatus for separating floating and non-floating particulate from drain water comprising:
  (a) a tank for separating particulate;
  (b) an inlet for introducing water drainage;
  (c) a bulkhead substantially cylindrical containment wall for containing non-floating particulate under relatively higher drain water flow rates and under relatively lower drain water flow rates, wherein a design of said containment wall induces a swirling of said drain water within said tank;
  (d) a baffle for containing floating particulate under said relatively higher drain water flow rates and under said relatively lower drain water flow rates;
  (e) an outlet;
  (f) an orifice plate for controlling drain water level within said tank as a function of the rate of discharge of said drain water under said relatively lower drain water flow rates; and
  (g) a weir plate for controlling said drain water level as a function of the rate of discharge of said drain water under said relatively higher drain water flow rates such that said drain water level within said tank is greater than a level of said inlet.

* * * * *